J. & W. TOOTHILL.
Lamp Stove.
No. 33,909.
Patented Dec. 10, 1861.
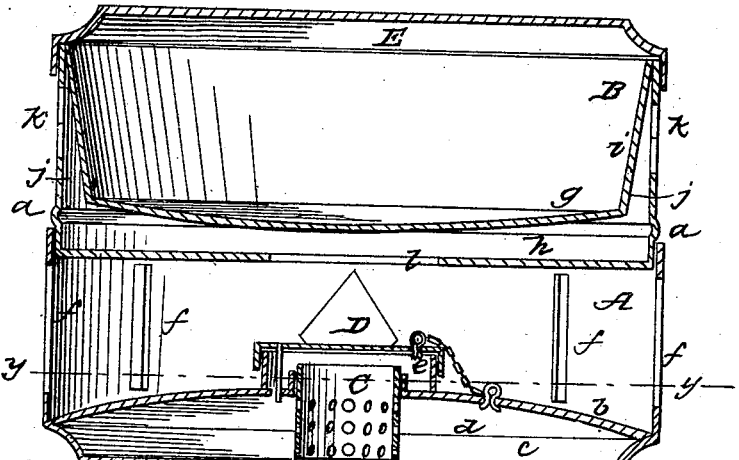
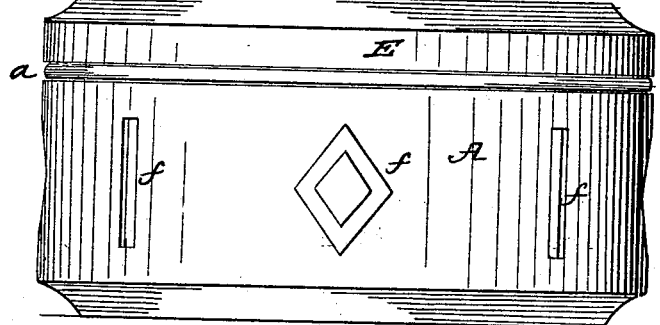
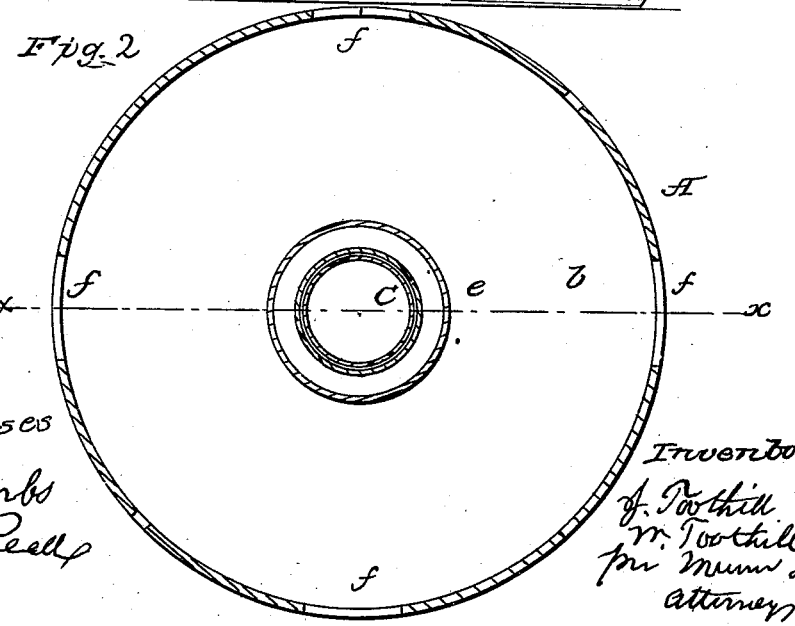

UNITED STATES PATENT OFFICE.

JOHN TOOTHILL AND WILLIAM TOOTHILL, OF WALLINGFORD, CONNECTICUT.

IMPROVEMENT IN PORTABLE COOKING APPARATUS.

Specification forming part of Letters Patent No. 33,909, dated December 10, 1861.

*To all whom it may concern:*

Be it known that we, JOHN TOOTHILL and WILLIAM TOOTHILL, of Wallingford, in the county of New Haven and State of Connecticut, have invented a new and Improved Portable Cooking Device, designed more especially for camp purposes; and we do hereby declare that the following is a full, clear, and exact description of the same, reference being had to the annexed drawings, making a part of this specification, in which—

Figure 1 is a vertical central section of the invention adjusted for use, taken in the line $xx$, Fig. 2; Fig. 2, a horizontal section of Fig. 1, taken in the line $yy$; Fig. 3, a side view of the invention in a closed state or with the parts adjusted for transportation.

Similar letters of reference indicate corresponding parts in the several figures.

The object of this invention is to obtain a very portable and simple cooking device which may be carried without inconvenience by a soldier and be capable of being readily adjusted for cooking, so that every soldier may be provided with the means for cooking his own rations.

The invention consists in the employment or use of two pans having false bottoms, one of the pans being provided with a lamp and both provided with openings, as hereinafter shown and described, whereby the desired end is attained.

To enable those skilled in the art to fully understand and construct our invention, we will proceed to describe it.

A B represent two pans, which may be of cylindrical form and of any suitable dimensions. It would be preferable, however, not to have them exceed in diameter an ordinary dining-plate. The pan B is a trifle smaller in diameter than A, so that the former may fit within the latter, and the pan B has a bead $a$ all around its exterior surface, which limits the distance that B may be fitted in A, as will be seen by referring to Figs. 1 and 3. The bead $a$ is much nearer the bottom than the top of pan B. (See Fig. 1.)

The pan A is provided with a false bottom $b$, which is some distance above the real bottom $c$, the space between forming a grease-receptacle. The false bottom $b$ has a circular opening at its center, through which a perforated tube C passes, said tube having a wick fitted in it. An annular flange $e$ is secured to the false bottom $b$ concentrically with the opening in it, and on this flange a cover or lid D is fitted when the device is not in use. The pan A has openings $f$ in its side, said openings extending all around the pan at suitable distances apart. The pan B is also provided with a false bottom $g$, which is some distance above the real bottom $h$, and the false bottom $g$ is connected to a false side $i$, which is inclined so as to make the interior of the pan at its lower part considerably smaller in diameter than the exterior, and admit of a chamber $j$, extending all around between the false and the real side, as shown clearly in Fig. 1. The outer side of the pan B has openings $k$ made in it, said openings extending all around the pan at a suitable distance apart, and the real bottom $h$ has a circular opening $l$ made in it, said opening being directly over the wick-tube C.

E is a lid or cover, which may be fitted on either end of the pan B.

When the implement or device is in use the lower part of the pan B is fitted in the upper part of the pan A, the chamber $d$ being supplied with grease, (the refuse grease of the camp provisions will answer,) and the wick in the tube C lighted. The flame is supplied with air through the openings $f$, and the smoke and gases from the flame pass up through the opening $l$, in the bottom $h$, of pan B, and into the space $j$ around the inner or false side $i$ of said pan, the smoke and gases escaping through the openings $k$. It will be seen, therefore, that the contents of the pan B will be exposed to a heated surface all around and at the bottom of the pan and will be quickly cooked. During the process of cooking the lid or cover E is placed on the top of the pan B. This lid or cover may be used as a plate after the process of cooking has been gone through with.

When the implement or device is not in use, the wick is extinguished and the cover or lid D fitted on the flange $e$. The pan B is inverted and fitted within the pan A and the lid E placed on the bottom of B, as shown in Fig. 3.

All of the parts are constructed of sheet metal, and the device may be furnished at a moderate cost.

Having thus described our invention, what we claim as new, and desire to secure by Letters Patent, is—

The two pans A B, provided, respectively, with the false bottoms $b$ $g$, draft-openings $f$ $k$, lamp, and false side $i$, and with or without the lid or cover E, all arranged as and for the purpose set forth.

JOHN TOOTHILL.
     WILLIAM TOOTHILL.

Witnesses:
 E. S. IVES,
 CHAS. H. S. DAVIS.